United States Patent
Bolz et al.

(10) Patent No.: US 6,547,693 B1
(45) Date of Patent: Apr. 15, 2003

(54) SYSTEM FOR HYDRAULIC TRANSMISSION REGULATION OF A CVT

(75) Inventors: Martin-Peter Bolz, Oberstenfeld (DE); Joachim Luh, Bietigheim-Bissingen (DE)

(73) Assignee: Robert-Bosch GmbH, Gerlingen-Schillerhoehe (DE)

( * ) Notice: Subject to any disclaimer, the term of this patent is extended or adjusted under 35 U.S.C. 154(b) by 26 days.

(21) Appl. No.: 09/786,860
(22) PCT Filed: Jul. 4, 2000
(86) PCT No.: PCT/DE00/02182
§ 371 (c)(1),
(2), (4) Date: Apr. 6, 2001
(87) PCT Pub. No.: WO01/04517
PCT Pub. Date: Jan. 18, 2001

(30) Foreign Application Priority Data

Jul. 10, 1999 (DE) .......................................... 199 32 310
Aug. 27, 1999 (DE) .......................................... 199 40 670

(51) Int. Cl.[7] .............................................. B60K 41/12
(52) U.S. Cl. .............................. 477/45; 477/48; 477/50
(58) Field of Search .............................. 477/45, 50, 46, 477/48; 701/51; 474/28

(56) References Cited

U.S. PATENT DOCUMENTS

| 4,702,128 A | | 10/1987 | Oshiage ...................... 74/866 |
| 4,735,113 A | * | 4/1988 | Yamamuro et al. ........... 477/38 |
| 5,257,960 A | | 11/1993 | Sato .............................. 474/69 |
| 5,916,061 A | * | 6/1999 | Koyama et al. ............ 477/171 |
| 5,928,301 A | * | 7/1999 | Soga et al. .................... 477/31 |
| 5,971,876 A | * | 10/1999 | Spiess et al. .................. 474/18 |
| 6,086,507 A | * | 7/2000 | Luh ............................. 477/48 |
| 6,109,031 A | * | 8/2000 | Katagiri et al. ............... 60/431 |
| 6,250,077 B1 | * | 6/2001 | Iino et al. .................... 180/338 |

FOREIGN PATENT DOCUMENTS

| DE | 196 49 483 | 6/1998 |
| EP | 0 451 887 | 10/1991 |
| EP | 0 797 742 | 4/1999 |

* cited by examiner

Primary Examiner—Sherry Estremsky
Assistant Examiner—Tisha D. Lewis

(57) ABSTRACT

The invention proceeds from a system for generating a signal for hydraulically adjusting the transmission ratio of a continuously variable transmission in a motor vehicle. Here, a valve is provided which influences the hydraulic connection from a pressure reservoir, which exhibits a hydraulic pressure, to a pressure chamber. The adjustment of the transmission ratio takes place via the drive of at least the valve via the electrical signal. For this purpose, the electrical signal is generated in such a manner that it is limited to maximum and/or minimum values. The essence of the invention is that the maximum and/or minimum values are determined in dependence upon the hydraulic pressure. With the limiting in accordance with the invention, it is ensured that an adequate pressure reserve for the adjustment of the belt tension is available notwithstanding the adjustment of the transmission ratio. A collapse of the secondary pressure, which is necessary for the belt tension, and therefore the danger of slippage of the wrap-around element is thereby avoided. The invention permits a rapid transmission ratio adjustment because the speed of adjustment goes up to the limit of a maximum possible adjustment with a view to a reliable adjustment of the belt tension.

12 Claims, 4 Drawing Sheets

SYSTEM FOR HYDRAULIC TRANSMISSION REGULATION OF A CVT

FIELD OF THE INVENTION

The invention proceeds from a system for generating a signal for hydraulically adjusting the transmission ratio of a continuously variable transmission in a motor vehicle.

BACKGROUND OF THE INVENTION

Continuously variable vehicle transmissions having a thrust band are, for example, known from DE 196 49 483 A, EP 0 451 887 A or EP 0 797 742 A. As will be explained in detail in the following, the adjustment of the transmission ratio takes place hydraulically via the adjustment of a so-called primary valve. To adjust the transmission ratio, an electric current is applied to the primary valve and thereby a specific hydraulic oil pressure is adjusted on the primary end, that is, on the drive end of the transmission. The primary valve can, for example, be configured as a magnetic valve. In DE 196 49 483 A, the suggestion is made to limit the adjustment of the transmission ratio in dependence upon the detected rotational movement of the primary end.

The tension of the belt can be adjusted with the aid of a pressure limiting valve at the secondary end, that is, at the output end of the transmission.

For a rapid transmission ratio adjustment of the transmission, for example, during a high deceleration of the vehicle, a large amount of oil is needed within a short time for the adjustment of the transmission ratio. The pressure in the secondary oil chamber can collapse when the hydraulic oil pump does not make available an adequate oil volume flow because the primary valve has adjusted an opening cross section which is too large. As a consequence, the belt tension can become too low and the thrust belt slips. This is intended to be prevented by the present invention in accordance with the task.

SUMMARY OF THE INVENTION

As already mentioned, the invention proceeds from a system for generating a signal to hydraulically adjust the transmission ratio of a continuously variable transmission in a motor vehicle. A valve is provided which influences the hydraulic connection from an pressure reservoir, which has a hydraulic pressure, to a pressure chamber. The adjustment of the transmission ratio takes place via the drive of at least the valve with the electrical signal. For this purpose, the electrical signal is generated in such a manner that it is limited to maximum and/or minimum values.

The essence of the invention is that the maximum and/or minimum values are determined in dependence upon the hydraulic pressure.

With the limiting in accordance with the invention, it is ensured that an adequate pressure reserve is made available for the adjustment of the belt tension notwithstanding the adjustment of the transmission ratio. A collapse of the secondary pressure, which is necessary for the belt tension, and the problem of slippage of the belt element is thereby avoided. The invention permits a rapid transmission ratio adjustment because the speed of adjustment goes to the limits of the maximum possible adjustment with the view toward a reliable belt tension adjustment.

In an advantageous configuration, it is provided that the adjustment of the pregivable tension takes place by the adjustment of the hydraulic pressure. This pressure can be detected by a hydraulic sensor.

The adjustment of the belt tension takes place especially in that the hydraulic pressure is adjusted (especially controlled) to a desired value. The limits of the invention are then selected in such a manner that the hydraulic pressure can be adjusted to the desired value in each case.

In a first variation of the invention, it is provided that the maximum and/or minimum values are determined in dependence upon a comparison or the difference between the hydraulic pressure and the corresponding desired value. The maximum and/or minimum values (I max, I min) can be determined in such a manner that the hydraulic connection from the pressure reservoir, which exhibits the hydraulic pressure (Ps,act), to the pressure chamber 12 is then limited when the desired value (Ps,des) exceeds the hydraulic pressure (Ps,act) by a pregivable extent.

A second variation of the invention is directed to the hydraulic pump for pumping the hydraulic volume flow with the hydraulic pump being driven especially by the vehicle motor. Here, it is provided that:

- a pumped volume value, which represents the instantaneous hydraulic volume flow, is determined at least in dependence upon the operating state of the hydraulic pump and especially in dependence upon the rpm of the vehicle motor; and,
- a hydraulic volume flow, which is required for the hydraulic oil pressure supply, is determined at least in dependence upon the desired value; and,
- the maximum and/or minimum values are determined in dependence upon a comparison or the difference between the pumped volume value and the required hydraulic volume flow.

In this variation of the invention, it can be provided that the determination of the required hydraulic volume flow continues to be performed in dependence upon a comparison or upon the difference between the hydraulic pressure and the desired value (Ps,des). The determination of the required hydraulic volume flow can take place by means of a characteristic field. The characteristic field is adapted to tolerances of the transmission, for example, the manufacturing-caused tolerances and/or deterioration-caused tolerances by the comparison or by the difference between the hydraulic pressure and the desired value. The invention thereby permits a rapid transmission ratio adjustment because the speed of adjustment goes to the limits of the maximum possible adjustment because manufacturing and deterioration tolerances need not be considered in the context of a worst case scenario.

BRIEF DESCRIPTION OF THE DRAWINGS

The invention will now be described with respect to the drawings.

In FIG. 2, a block circuit diagram of the limiting of the invention can be seen in general form; whereas

DESCRIPTION OF THE PREFERRED EMBODIMENTS OF THE INVENTION

Figure 1:
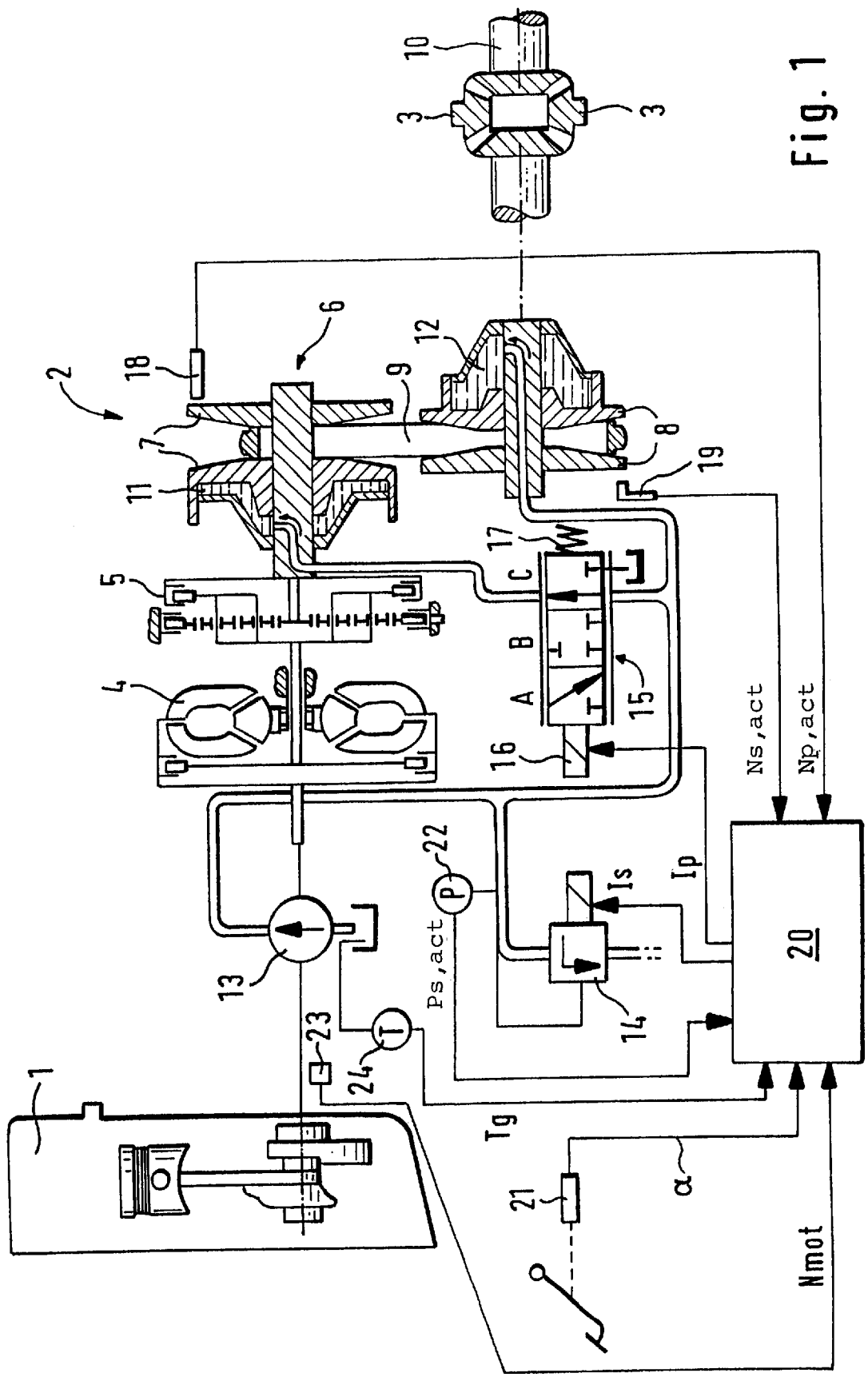
FIG. 1 shows an overview diagram of a continuously variable transmission.

The invention will be explained in greater detail in the following with respect to embodiments. In FIG. 1, reference numeral 2 identifies a continuously variable transmission in motor vehicles for the purpose of transmitting force from the engine 1 to the drive shafts 3 of the wheels. Such a continuously variable transmission has, for example, a torque converter 4 and clutches 5 for forward and rearward shifting which are mounted between the engine 1 and the variator 6. The variator 6 comprises a drive end (primary) and an output end (secondary) conical pulley set 7 and 8. The force is transmitted from the drive pulley set 7 to the output pulley set 8 with the aid of a chain or a thrust belt 9. Each of the conical pulley sets comprises an axially fixed pulley and an axially movable pulley. The transmission ratio of the variator 6 changes from the high start drive ratio "low" to a low transmission ratio "overdrive" by simultaneously varying the axially movable pulleys on the drive pulley set and the output pulley set.

The output pulley set is connected via a compensating transmission 10 to the drive shafts 3 of the wheels. The axially movable conical pulleys 7 and 8 are hydraulically adjustable and have oil chambers 11 and 12 for this purpose.

The transmission has an oil pump 13 for suppling pressurized oil and this pump runs, for example, with the rpm of the internal combustion engine 1. In one embodiment, the tension of the belt 9 is adjusted with the aid of a pressure limiting valve 14 which controls the pressure, the secondary pressure, in the output end oil chamber 12. The pressure limiting valve 14 is driven for this purpose by the control apparatus 20 by means of the current Is.

The transmission ratio is adjusted with the aid of a proportional valve (primary valve) 15 at the primary end. The valve 15 can, for example, be configured as a magnetic valve. The secondary pressure is detected by the pressure sensor 22 and is supplied to the control apparatus 20 as signal Ps,act.

In the embodiment shown in FIG. 1, a force on the valve slider is generated by adjusting the current Ip in the magnet 16. A specific position of the proportional valve 15 adjusts because of the spring 17 present at the valve slide. This means that the current Ip through the magnet 16 determines the position of the proportional valve 15 and therefore the opening cross section of the valve.

The primary valve 15 can release oil from the drive end oil chamber 11 (primary oil chamber) to the oil tank in the position A (greater drive current) and thereby reduce the pressure whereby the transmission ratio is shifted to low. In the position C (lower drive current), oil flows into the drive end oil chamber 11 whereby the transmission ratio changes in the direction "overdrive" and the pressure in the drive end oil chamber 11 increases. In the position B of the proportional valve 15 (drive current has a mean value), the valve is closed and the primary oil chamber 11 is sealed off, that is, virtually no oil can flow into the oil chamber 11 or flow out therefrom. In this way, the transmission ratio of the transmission remains at least essentially constant. The proportional valve 15 can, for example, be directly controlled or can be driven by a precontrol valve in a manner known per se.

Furthermore, a sensor 18 exists to determine the primary rpm Np and a sensor 19 for determining the secondary rpm Ns. The primary and secondary sensor signals Np and Ns are supplied to a control apparatus 20 which adjusts the current Ip through the magnet 16 of the proportional valve 15. Furthermore, a sensor 21 for determining the position a of the accelerator pedal actuated by the driver is, for example, connected.

The transmission temperature or the transmission oil temperature is detected by the temperature sensor 24 and is supplied as signal Tg to the control apparatus 20.

The valve 14 is, for example, configured as a magnetic valve. The secondary pressure in the secondary oil chamber 12 is adjusted with the current Is of the valve 14.

As mentioned initially herein, a great deal of oil is needed within a short time for adjusting the primary conical pulleys in a rapid adjustment of the transmission ratio of the transmission. This is, for example, the case when, during an intense deceleration of the vehicle, the transmission ratio is adjusted very rapidly in the direction of the start-drive transmission ratio (low). This means that, under some circumstances, the primary valve 15 releases a large quantity of oil from the primary chamber 11 in the position A because of a large drive current Ip. The distance between the primary conical pulleys increases. To adjust the start-drive transmission ratio, the distance between the secondary conical pulleys is reduced simultaneously. The pressure in the secondary oil chamber 12 can collapse when, in this case, the oil pump 23 does not make an adequate oil volume flow available. This is so because the primary valve 15 has adjusted too large an opening cross section. As a consequence, the belt tension can become too low and the thrust belt 9 exhibits an excessive slippage, it slips. In general, this leads to an excessive wear or to the destruction of the belt 9. This case is to be avoided by the following control of the primary valve 15.

Figure 2:
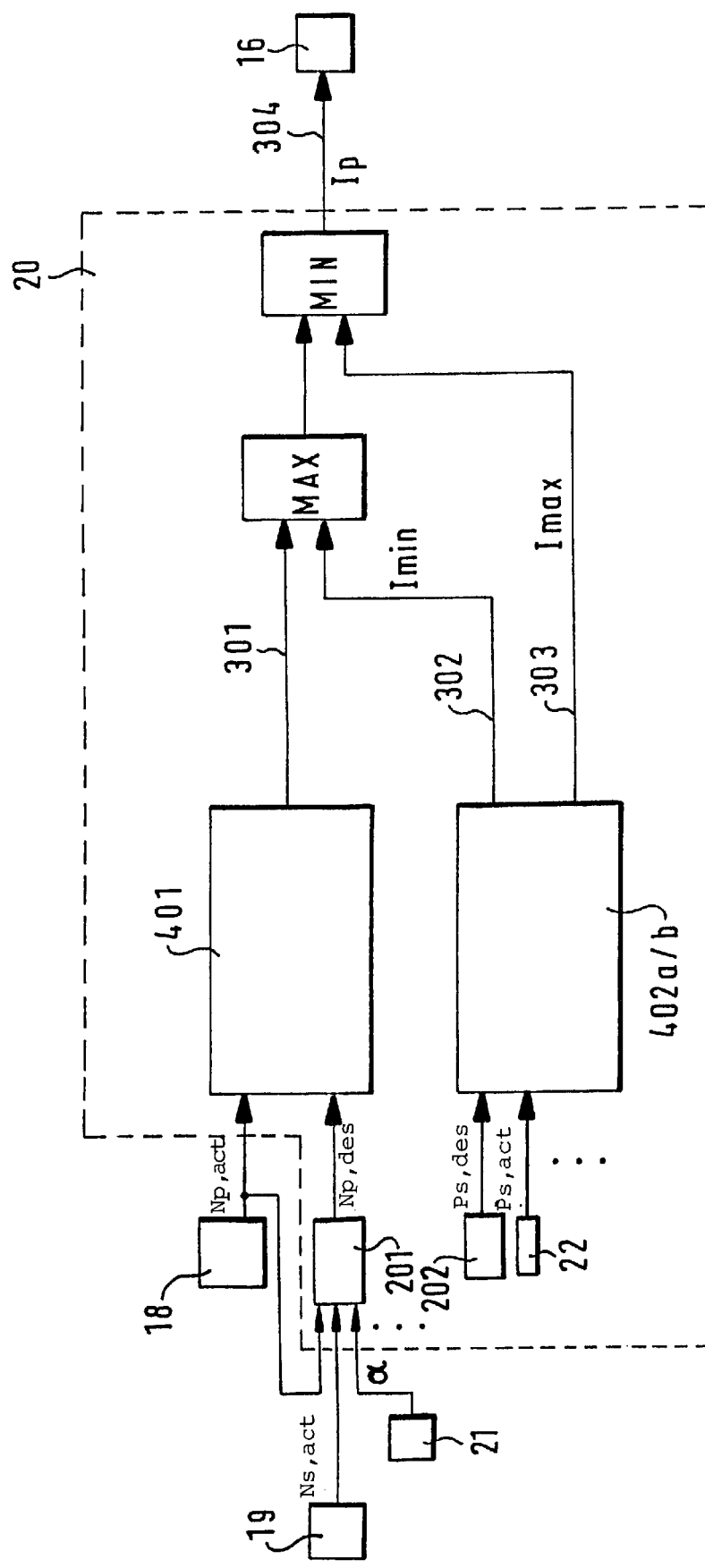

In FIG. 2, a portion of the control apparatus 20 can be seen. A computation block 401 is provided in the control 20 for the adjustment of the transmission ratio U. The computation block 401 computes a desired current signal Ides (301) for the primary valve 15 from a comparison of the desired primary rpm Np,des and the actual primary rpm Np,act. The desired primary rpm Np,des is, in a manner known per se, derived from the accelerator pedal position α (sensor 21), the road speed or actual secondary rpm Ns,act (sensor 19) as well as quantities in block 201 as may be required.

Furthermore, the computation block 402 (in the variations 402a and 402b) is present which computes a maximum current I max (303) and a minimum current I min (302). This takes place in dependence upon specific input quantities in the manner yet to be described.

The flow signal Ides (301) through the primary valve 15 is limited to the minimum and maximum current signals I min and I max to the drive signal Ip (304). This takes place in the maximum and minimum selectors MAX and MIN shown in FIG. 2 in that the maximum or minimum values of the input signals (Ides and I min at MAX and Ides and I max at MIN) are applied to the output of the blocks MAX and MIN. The limited current signal Ip is used for the drive of the primary valve 15.

Two variations are suggested for computing the minimum and maximum current signals I min and I max (302 and 303) in the block 402.

Figure 3:
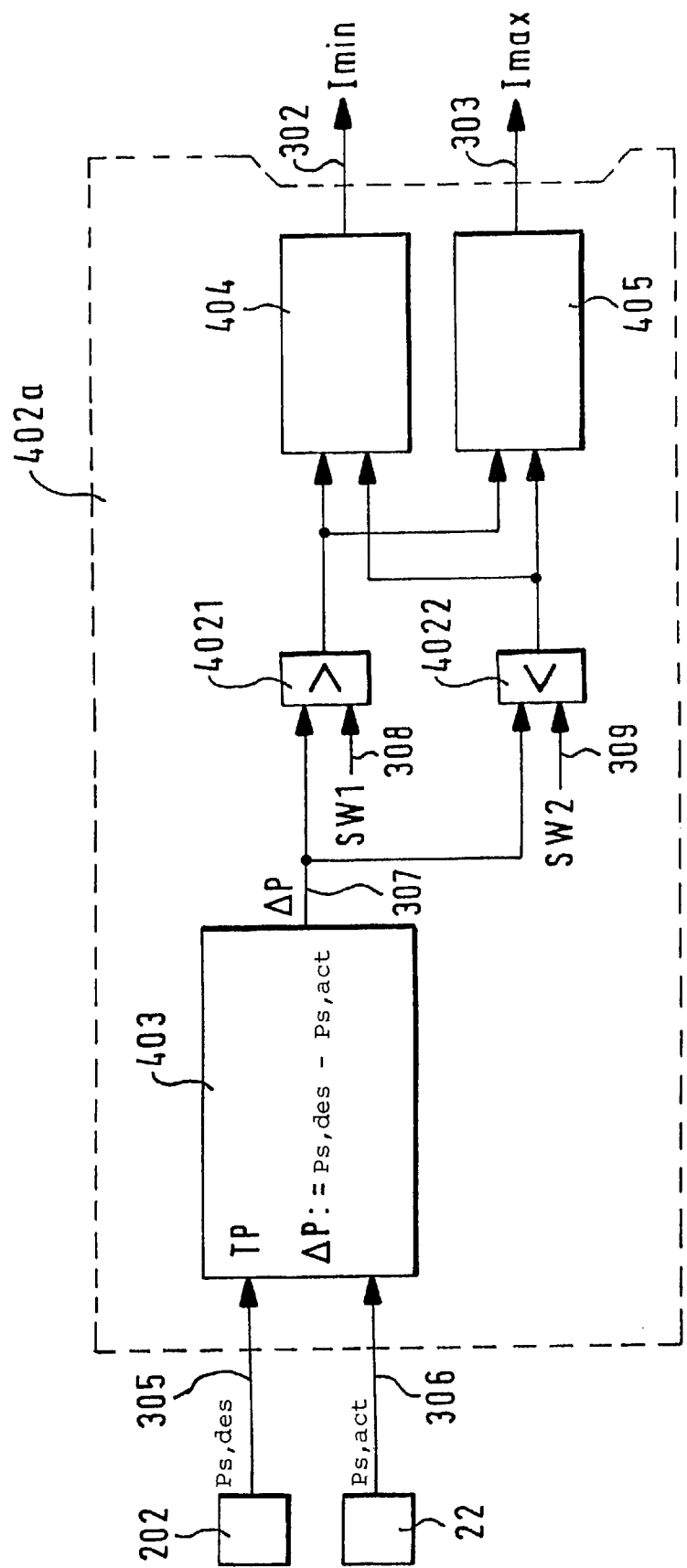
FIGS. 3 and 4 show two variations of the invention.

The basic idea of the first variation shown in FIG. 3 is that, with the signal Ps,act of the secondary pressure sensor 22, the desired secondary pressure Ps,des is compared to the actual secondary pressure Ps,act. The desired secondary pressure Ps,des is formed in block 202 in a manner known per se. As already mentioned, the pressure adjustment on the secondary end of the transmission serves for adjusting the belt tension so that no significant slippage occurs between the conical pulleys and the belt 9. In order to optimize the overall efficiency of the transmission because of unnecessary energy losses, the desired secondary pressure Ps,des can, however, not be set too high in block 202 but instead, in the ideal case, just so that no slippage occurs between the belt 9 and the conical pulleys. For this reason, the desired secondary pressure Ps,des is formed in block 202 essentially dependent upon the transmission input torque (engine torque). The determination of the desired secondary pressure Ps,des is not the subject matter of this invention and, for this reason, reference as to details is, for example, made to EP 0 797 742 A referred to initially herein.

When the actual secondary pressure Ps,act is less than the desired secondary pressure Ps,des for a certain time, then the limiting signals I min and I max (302 and 303) for the primary current Ides are adapted so long until the actual secondary pressure Ps,act is again greater than the desired secondary pressure Ps,des.

Figure 4:
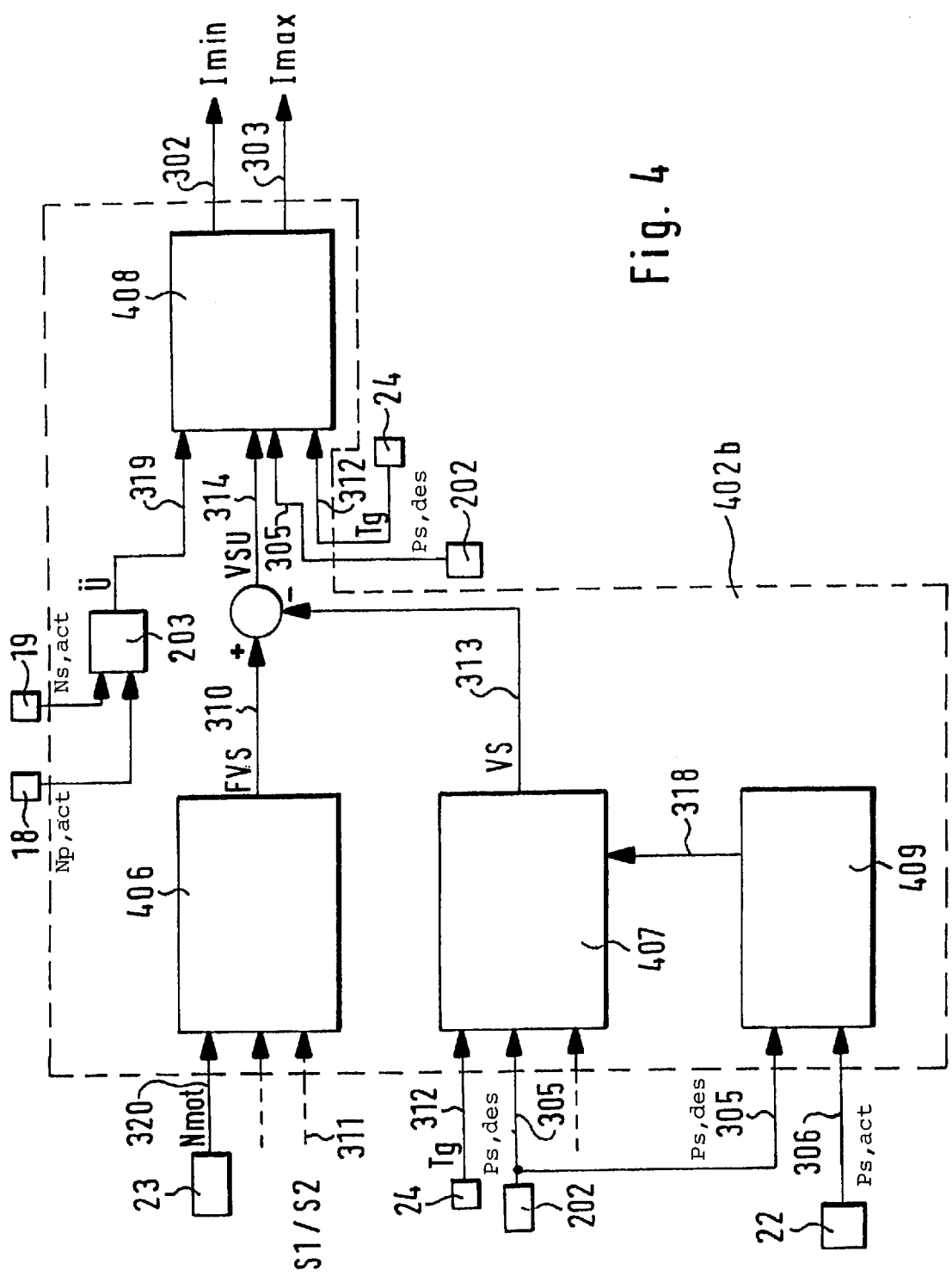

The basic idea of the second variation shown in FIG. 4 is that the limiting signals I min and I max are obtained from an estimation of the pumping volume of the pump and of the oil consumption of the transmission and that, furthermore, an adaptation of the limiting signals is present via a comparison of the actual secondary pressure Ps,act with the desired secondary pressure Ps,des.

Both variations can also be utilized in combination.

For the First Variation (FIG. 3)

In the computation block 403, the desired secondary pressure Ps,des (305) of the belt tension control 202 is compared to the actual secondary pressure Ps,act (306) of the pressure sensor 22. This takes place in that the difference $$\Delta P' = Ps,des - Ps,act$$

is formed. For suppressing short-term fluctuations, the result $\Delta P'$ is lowpass filtered to the output signal/fault signal $\Delta P$.

The fault signal $\Delta P$ (307) which is so obtained thereby assumes positive values when the actual secondary pressure Ps,act is less than the desired secondary pressure Ps,des for a certain time. This means that the actual pressure in the secondary chamber 12 is not sufficient in order to realize the desired or required desired pressure. In block 4021, the value $\Delta P$ is compared to the pregivable threshold value SW1.

When the signal $\Delta P$ is greater than the threshold value SW1 (308), then this means that the instantaneous actual secondary pressure is not sufficient in order to avoid an excessive belt slippage. In response thereto, the following is triggered by a corresponding driving of the blocks 404 and 405:

the minimum primary current I min (302) is increased; and, the maximum primary current I max (303) is reduced.

With the reduction of the maximum possible primary current I max, it is achieved that only a limited oil quantity can flow away from the primary chamber 11 because of the limited opening of the primary valve 15 in the position A. In this way, the speed of the transmission ratio adjustment in the direction "low" (distance of the primary conical pulleys increases) is limited. With the adjustment in the direction "low", the distance of the secondary conical pulley becomes less which can lead to a drop of the secondary pressure Ps,act in the event the pump 13 does not pump enough. Accordingly, with the limiting of the drive current of the primary valve, a limiting of the adjusting speed at the secondary end is therefore effected simultaneously, which, in turn, leads to the situation that an applied pressure is ensured in the secondary chamber 12 which is adequately high for preventing the belt slippage.

The speed of a desired adjustment of the transmission ratio in the direction "overdrive" is limited because of the increase of the minimum possible current value I min. In the case wherein the pump does not pump an adequately large quantity of oil, a rapid adjustment in the direction "overdrive" would directly reduce the secondary pressure Ps,act whereby the applied force to the belt 9 via the secondary pressure could become inadequate.

When the signal $\Delta P$ (307) is less than a threshold value SW2 (309), this means that the instantaneous actual secondary pressure is of adequate magnitude in order to avoid an excessive belt slippage. In reaction to this, the following is triggered via a corresponding driving of blocks 404 and 405:

the minimum primary current I min (302) is reduced; and, the maximum primary current I max (303) is increased.

Because of the increase of the maximum possible primary current I max, it is achieved that a larger quantity of oil can flow from the primary chamber 11 because of the opening of the primary valve 15 in the position A. In this way, the speed of the transmission ratio adjustment in the direction "low" (spacing of the primary conical pulley increases) is increased. The speed of the desired adjustment of the transmission ratio in the direction "overdrive" is increased by the reduction of the minimum possible current value I min. This means that, when the pumped volume of pump 13 is adequate, a desired adjustment of the transmission ratio can be realized with a high speed.

With the procedure in accordance with the first variation, a collapse of the secondary pressure and therefore the danger of slippage of the belt is effectively avoided. However, simultaneously, the control according to the invention permits a rapid adjustment of the transmission ratio because the speed of adjustment goes to the limits of the maximum possible adjustment when the secondary pressure is adequately large.

For the Second Variation (FIG. 4

In FIG. 4, a second variation of the invention is shown. In the present embodiment, the pump 13 is driven by the vehicle engine 1. The pumped volume flow FVS (310) of the oil pump 13 is computed in the computing block 406 from various signals, for example, from the engine rpm Nmot (320) and, if required, additional signals. If the pump 13 is a pump which can be switched electronically to different pumped quantities (switched positions S1 and S2), then, in the computation 406, the switch position S1/S2, which is set at the time, is applied for determining the signal FVS.

In the characteristic field block 407, an oil volume flow VS (313) is computed from additional signals, especially, a temperature signal Tg (312) for the transmission temperature (sensor 24), the desired secondary pressure signal Ps,des (305) and additional signals which concern, for example, the operating state of the clutches and of the converter clutch. This oil flow volume VS (313) is required for the constant transmission ratio in order to ensure the oil pressure supply of the transmission.

The difference between available pump volume flow FVS (310) and the oil volume flow signal VS (313) yields the oil volume flow VSU (314) which can be used for the transmission ratio adjustment.

With the aid of the characteristic field block 408, the minimum and maximum primary currents I min (302) and I max (303) are computed. Different signals are used in the characteristic field block 408 and especially: the computed transmission ratio U (319), the desired secondary pressure Ps,des (305) and the transmission temperature Tg (312). The transmission ratio U is determined in block 203 from the actual rpms of the primary and secondary ends of the transmission (sensors 18 and 19).

If it is determined in block 408 that the oil volume flow VS (313) is not sufficiently large, then the maximum and minimum values I max and I min are increased and reduced, respectively, as described in the first variation so that the pressure, which is needed to prevent belt slippage, is always ensured.

The characteristic field in block 407 is adapted to compute the oil volume flow signal VS (313) in the sense of an adaptation of the control parameters to the transmission tolerances. The adaptation takes place in block 408 by comparing the desired secondary pressure Ps,des and the actual secondary pressure Ps,act as in the first variation by forming the lowpass filtered difference ΔP.

When the fault signal ΔP (307) exceeds a pregivable threshold value, then the parameters 318 of the characteristic field block 407 are so adapted that the oil volume flow signal VS (313) becomes greater.

By means of the second variation of the invention, a collapse of the secondary pressure and therefore the danger of slippage of the wrap-around element is avoided.

The control in accordance with the second variation also permits a rapid adjustment of the transmission ratio. This is so because the speed of adjustment goes up to the limits of the maximum possible adjustment. With the adaptation in block 402, manufacturing and deterioration tolerances need not be considered in the sense of a worst case scenario as previously.

What is claimed is:

1. A system for generating a signal (Ip) for hydraulically adjusting the transmission ratio of a continuously variable transmission in a motor vehicle, the system comprising:
   a pressure reservoir exhibiting a hydraulic pressure (Ps, act);
   a pressure chamber hydraulically connected to said pressure reservoir;
   a valve for influencing the hydraulic connection between said pressure reservoir and said pressure chamber;
   a control apparatus for generating an electrical signal (Ip) for driving said valve to adjust the transmission ratio of said transmission and said electrical signal (Ip) being generated in such a manner that said electrical signal is limited to maximum and/or minimum values (I max, I min); and,
   means for determining said maximum and/or minimum values (I max, I min) in dependence upon the hydraulic pressure (Ps,act).

2. The system of claim 1, further comprising a pressure sensor for detecting said pressure (Ps,act).

3. The system of claim 2, wherein the hydraulic pressure (Ps,act) is adjusted to a desired value (Ps,des) and is controlled.

4. A system for generating a signal (Ip) for hydraulically adjusting the transmission ratio of a continuously variable transmission in a motor vehicle, the system comprising:
   a pressure reservoir exhibiting a hydraulic pressure (Ps, act);
   a pressure chamber hydraulically connected to said pressure reservoir;
   a valve for influencing the hydraulic connection between said pressure reservoir and said pressure chamber;
   a control apparatus for generating an electrical signal (Ip) for driving said valve to adjust the transmission ratio of said transmission and said electrical signal (Ip) being generated in such a manner that said electrical signal is limited to maximum and/or minimum values (I max, I min);
   means for determining said maximum and/or minimum values (I max, I min) in dependence upon the hydraulic pressure (Ps,act);
   a pressure sensor for detecting said pressure (Ps,act);
   the hydraulic pressure (Ps,act) being adjusted to a desired value (Ps,des) and being controlled; and,
   wherein the maximum and/or minimum values (I max, I min) are determined in dependence upon a comparison or upon the difference between the hydraulic pressure (Ps,act) and the desired value (Ps,des), wherein it is provided that the maximum and/or minimum values (I max, I min) are determined in such a manner that hydraulic connection from the pressure reservoir, which exhibits the hydraulic pressure (Ps,act), to the pressure chamber, is limited when the desired value (Ps,des) exceeds the hydraulic pressure (Ps,act) to a pregivable extent.

5. A system for generating a signal (Ip) for hydraulically adjusting the transmission ratio of a continuously variable transmission in a motor vehicle, the transmission having a drive end, an output end and a wrap-around part which connects the drive end to the output end; the system comprising:
   a pressure reservoir exhibiting a hydraulic pressure (ps, act);
   said output end having a pressure chamber hydraulically connected to said pressure reservoir;
   means for adjusting a pregivable tension of said wrap-around part;
   a valve for adjusting said transmission ratio of said transmission in response to an electrical signal (Ip) driving said valve;
   means for generating said electrical signal (Ip) in such a manner that said electrical signal is limited to maximum and/or minimum values (I max, I min); and,
   means for selecting the limitations (I max, I min) in such a manner that the adjustment of the tension is ensured.

6. The system of claim 5 wherein the adjustment of the pregivable tension takes place via the adjustment of the hydraulic pressure (Ps,act).

7. The system of claim 6, further comprising a pressure sensor for detecting said pressure (Ps,act).

8. The system of claim 6, wherein the hydraulic pressure (Ps,act) is adjusted to a desired value (Ps,des) and is controlled.

9. The system of claim 8 wherein the limitations (I max, I min) are selected in such a manner that the hydraulic pressure (Ps,act,) can be adjusted to the desired value (Ps,des).

10. A system for generating a signal (Ip) for hydraulically adjusting the transmission ratio of a continuously variable transmission in a motor vehicle, the transmission having a drive end, an output end and a wrap-around part which connects the drive end to the output end; the system comprising:
   means for adjusting a pregivable tension of said wrap-around part;
   a valve for adjusting said transmission ratio of said transmission in response to an electrical signal (Ip) driving said valve;
   means for generating said electrical signal (Ip) in such a manner that said electrical signal is limited to maximum and/or minimum values (I max, I min); and,
   means for selecting the limitations (I max, I min) in such a manner that the adjustment of the tension is ensured;
   wherein the hydraulic pressure (Ps,act) is adjusted to a desired value (Ps,des) and is controlled;
   a hydraulic pump, which is driven by the vehicle engine, is provided for pumping a hydraulic volume flow and:
      a pumped volume flow (FVS), which represents the instantaneous hydraulic volume flow, is determined at least dependent upon the operating state of the hydraulic pump, in dependence upon the rpm of the vehicle engine;

a hydraulic volume flow (VS), which is required for the hydraulic pressure supply, is determined at least in dependence of the desired value (Ps,des); and, the maximum and/or minimum values (I max, I min) are determined in dependence upon a comparison or the difference between the pumped volume value (FVS) and the required hydraulic volume flow (VS).

11. The system of claim 10, wherein the determination of the required hydraulic volume flow (VS) is further made in dependence upon a comparison or the difference between the hydraulic pressure (Ps,act) and the desired value (Ps,des).

12. The system of claim 11, wherein the determination of the required hydraulic volume flow (VS) takes place via a characteristic field and the characteristic field is adapted by the comparison or by the difference between the hydraulic pressure (Ps,act) and the desired value (Ps,des) to tolerances of the transmission which are caused by manufacture and/or deterioration.

* * * * *